United States Patent

[11] 3,608,997

| [72] | Inventor | William E. Humphrey<br>Oakland, Calif. |
|---|---|---|
| [21] | Appl. No. | 757,289 |
| [22] | Filed | Sept. 4, 1968 |
| [45] | Patented | Sept. 28, 1971 |
| [73] | Assignee | Optical Research and Development Corporation<br>Oakland, Calif. |

[54] FOCAL PLANE STABILIZATION SYSTEM
11 Claims, 5 Drawing Figs.

[52] U.S. Cl............................................. 350/16,
350/9, 350/54, 356/149, 350/55
[51] Int. Cl........................................... G02b 23/00
[50] Field of Search.......................... 350/16, 9;
356/144, 143, 148, 149, 248, 250; 95/12.5; 74/5

[56] References Cited
UNITED STATES PATENTS

| 2,220,884 | 11/1940 | Burka et al. | 356/149 |
| 2,389,142 | 11/1945 | Esval et al. | 356/149 |
| 2,959,088 | 11/1960 | Rantsch | 350/16 X |
| 3,377,910 | 4/1968 | Drodofsky | 350/16 |
| 3,424,520 | 1/1969 | Call | 350/16 X |
| 2,890,616 | 6/1959 | Bruscaglioni | 356/250 |
| 3,459,473 | 8/1969 | Call | 95/12.5 X |

FOREIGN PATENTS

| 146,960 | 1962 | U.S.S.R. | 350/16 |
| 347,869 | 10/1918 | Germany | 95/12.5 |

*Primary Examiner*—David H. Rubin
*Attorney*—Townsend and Townsend

ABSTRACT: An image-stabilizing device incorporating in one embodiment an objective lens rigidly mounted to a transmissive image display plate in which the image from the objective lens is focused on the image display plate on one side and displayed on the opposite side thereof in which the lens and image display plate are pivoted about an axis substantially aligned with the focal plane of the image display plate and further incorporating nonstabilized optics viewing the obverse side of the image display plate and in the second embodiment having an image-receiving plane and an inertially stabilized objective lens mounted for pivotal movement about the focal plane.

PATENTED SEP 28 1971 3,608,997

WILLIAM E. HUMPHREY
INVENTOR.

BY
Townsend and Townsend

FOCAL PLANE STABILIZATION SYSTEM

This invention relates to a new and improved telescope image-stabilizing system.

The object of the present invention is to provide an image-stabilizing system for telescopes which stabilizes the viewed image formed by the telescope objective lens despite motion or vibration of the viewing optics and telescope housing. The invention is thus particularly applicable to hand-held cameras and telescopes or cameras and telescopes mounted on moving systems. It may be adapted for either monocular or binocular use.

To accomplish this result, the present invention contemplates providing a telescope objective lens pivotally mounted and inertially stabilized by, for example, a gimbal mounted gyroscope. The stabilized objective lens is mounted for rotational movement relative to the telescope housing and viewing optics about a pivot point lying substantially in the plane of an image formed by the telescope objective lens. The pivot point for rotational movement is provided, for example, by the mutually orthogonal mounting axes of the gyroscope gimbals. The invention is adapted for image stabilization in either cameras or ocular telescopes and binoculars. Thus, "viewing optics" and "viewing means" are used generally to include both camera viewing means and ocular eyepiece systems.

A variety of telescope objectives may be used such as a simple refracting lens or a more complex Cassegrainian-type or Maksutov-type objective.

In one embodiment of the invention an image display screen is positioned in the focal plane of the telescope objective and the viewing optics positioned for viewing the real image displayed on the image display screen. The inertially stabilized telescope objective is mounted for rotation relative to the viewing optics and telescope housing about a pivot point lying in the plane of the image display screen.

In another embodiment of the invention an image transfer plate is provided having a first surface positioned at the focal plane of the telescope objective and a second surface spaced from the first surface for displaying an image transferred from the first surface. The viewing optics are positioned for viewing the displayed image on the second surface of the image transfer plate. The image transfer plate may be formed, for example, from an image intensifier or a fiber optics fused plate of measurable thickness.

According to one aspect of the invention, the telescope objective and image transfer plate are rigidly oriented relative to a common axis and the pivot point for rotational movement of the inertially stabilized telescope objective and image transfer plate relative to the telescope housing lies in the plane of the second surface where the viewed image is displayed.

According to another aspect of the invention, the viewing optics and image transfer plate are rigidly oriented with respect to a common axis and the pivot point for rotational movement of the inertially stabilized telescope objective relative to the viewing optics, image transfer plate and telescope housing lies in the plane of the first surface of the image transfer plate where an image formed by the telescope objective is received.

Thus, the invention generally contemplates stabilizing images formed by a telescope objective by mounting an inertially stabilized telescope objective for rotational movement relative to the telescope housing and viewing optics about a pivot point lying substantially in the focal plane of the inertially stabilized telescope lens. An image display screen may be interposed at the focal plane of the telescope objective for viewing through the eyepiece a real image displayed on the screen. If an image display plate of nonnegligible thickness is provided with a first surface at the focal plane of the telescope objective, and a second surface spaced from the first surface, the pivot point for relative rotational movement of the telescope objective and the viewing optics lies in either the second surface or the first surface of the image transfer plate depending upon whether the transfer plate is rigidly aligned with the telescope objective or the eyepiece respectively.

It is possible with stabilizing systems of the type described above to achieve image stabilization of the type required for accidental-motion compensation, either with cameras or ocular viewing devices. In this respect, it is particularly noted that for camera applications, accidental-motion compensators should maintain an image from the objective substantially stationary, or in a fixed position, on a film plane. In this way, small accidental movements or vibrations of a camera housing to which the objective and film plane are mounted will be properly compensated, so that a 100 percent stabilized image is presented to the film at the coincident stabilized image plane and film plane. On the other hand, ocular viewing devices such as ocular telescopes and binoculars ideally require a modified stabilization other than 100 percent, so that center field light rays leaving the device are parallel to center field light rays entering the device and will therefore not appear to the viewer to be deflected with device vibrations. A full explanation of this difference in stabilization is set forth in my copending Pat. application Ser. No. 575,624, filed in the U.S. Pat. Office on Aug. 29, 1966, and entitled "Optical Stabilization by Reflecting Means," now U.S. Pat. No. 3,468,595, issued Sept. 23, 1969. Reference is made to such above-identified patent application for a complete discussion of this point; however, it is briefly noted herein that camera stabilization, or 100 percent stabilization, as it is sometimes termed, is to be modified by the factor $[(1\pm(1/M))]$ for ocular viewing devices wherein M is the overall magnification of the optical system. The fraction of "camera stabilization" required for erecting viewing devices is $[(1-(1/M))]$ and, for inverting viewing devices, the fraction of "camera stabilization" is $[(1+(1/M))]$. In the following discussion of the present invention reference is generally made to 100 percent camera stabilization; and it is to be understood that such is to be modified by the foregoing factor for ocular viewing devices, such as binoculars, ocular telescopes and the like.

Thus, in the embodiments of the invention summarized above, the pivot arm distances between the telescope objective and the pivot point have been defined for 100 percent camera stabilization. In one instance the pivot arm distance is the focal length of the telescope objective while in the other it is the focal length of the telescope objective plus the width of the image transfer plate. Though such an arrangement is also satisfactory for ocular viewing devices and preferable to an unstabilized image, the ideal stabilization for ocular viewing devices is obtained by modifying the pivot arm distance by one of the factors described above.

For terrestrial and erecting ocular telescopes and binoculars, the pivot point should be located to provide a pivot arm distance modified by a factor $[(1-(1/M))]$ from that required for 100 percent camera stabilization. For astronomical and inverting telescopes the pivot arm distance should be modified by a factor $[(1+(1/M))]$ from that required for 100 percent camera stabilization.

In the following specification and accompanying drawings, the pivot point location is defined to provide the pivot arm distance between the objective lens and pivot point requisite for 100 percent camera stabilization. Ideally, for ocular viewing devices the pivot arm distance is to be modified accordingly by the factors indicated above. One hundred percent camera stabilization provides satisfactory results in most cases, however.

Figure 1:
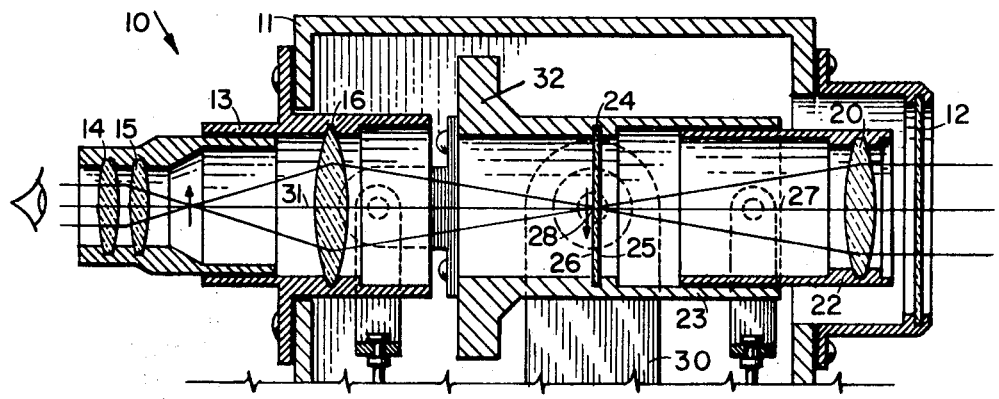
FIG. 1 is a side cross-sectional view of a telescope image stabilization system embodying the present invention.

In the embodiment of the present invention illustrated in FIG. 1 there is provided a telescope 10 comprised of a housing 11 to which is rigidly connected a window 12 for admitting light from the field surveyed by the telescope, and an eyepiece lens system 13 through which an image of the surveyed field may be viewed. The eyepiece lens system 13 or viewing optics is formed by eyepiece lenses 14 and 15 and erecting lens 16 for erecting an image formed by the telescope objective lens.

The objective lens 20 is within a cylindrical tube 22, which is in turn coaxially retained within a cylindrical support 23. Mounted in the support 23 in axial alignment with the objective lens 20 is an image transfer plate 24 having a first surface 25 positioned in the focal plane of objective lens 20 and second surface 26 spaced from the first surface and adapted to display an image received on the first surface 25 and transferred to the second surface 26. The objective lens 20 and image transfer plate 24 are rigidly oriented with respect to a common axis 27, the optical axis of the objective lens 20. The objective lens 20 may slide longitudinally along the axis 27, however, for focusing. The support 23 and tube 22 housing the objective lens and image transfer plate are universally pivotally mounted independently of the housing 11 of telescope 10 for free movement relative to the housing about a pivot point 28 lying in the second surface 26 of the image transfer plate. The pivot point 28 may be provided, by way of example, by the orthogonal axes of gimbals 30 in which the support 23 and a gyroscope are pivoted. The gyroscope provides inertial stabilization of the objective lens 20 and image transfer plate 24 upon angular vibration or motion of the housing 11 of telescope 10.

The end support 23 opposite objective lens 20 may be provided with suitable weights 32 to provide a counterweight to the objective lens 20 about the pivot point 28.

Figures 2, 4:
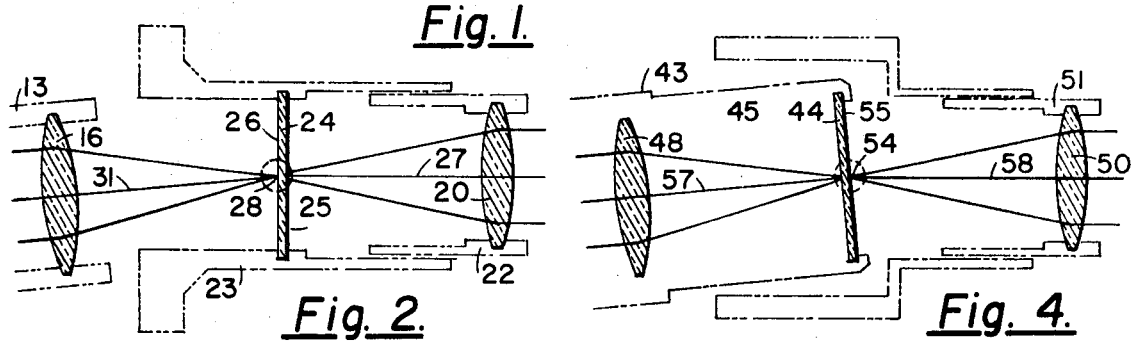
FIG. 2 is a fragmentary side cross-sectional view of the telescope illustrated in FIG. 1 showing relative movement between the viewing optics and the inertially stabilized telescope objective and image transfer plate.
FIG. 4 is a fragmentary side cross-sectional view of the telescope illustrated in FIG. 3 showing relative movement between the viewing optics and image transfer plate, and the inertially stabilized telescope objective lens.

As illustrated in FIG. 2, upon vibration or motion of the telescope housing 11 and eyepiece optical system 13, the support 23 and tube 22 are inertially stabilized by the gyroscope so that the eyepiece viewing optics 13 rotate relative to the inertially stabilized objective lens 20 and image transfer plate 24 about the pivot point 28 lying in the second surface 26 on which an image formed by the objective lens 20 is displayed and viewed by the eyepiece lens system. With the objective lens 20 and image transfer plate 24 rigidly oriented with respect to the common optical axis 27, the pivot point for relative motion of the eyepiece lens is fixed at a pivot point 28 lying in the image display surface 26 so that the image viewed by the eyepiece lens system 13 remains stationary. The pivot point 28 is thus located substantially at an intersection of the objective lens optical axis 27 and the eyepiece lens system optical axis 31 in the image display plane 26.

Figure 3:
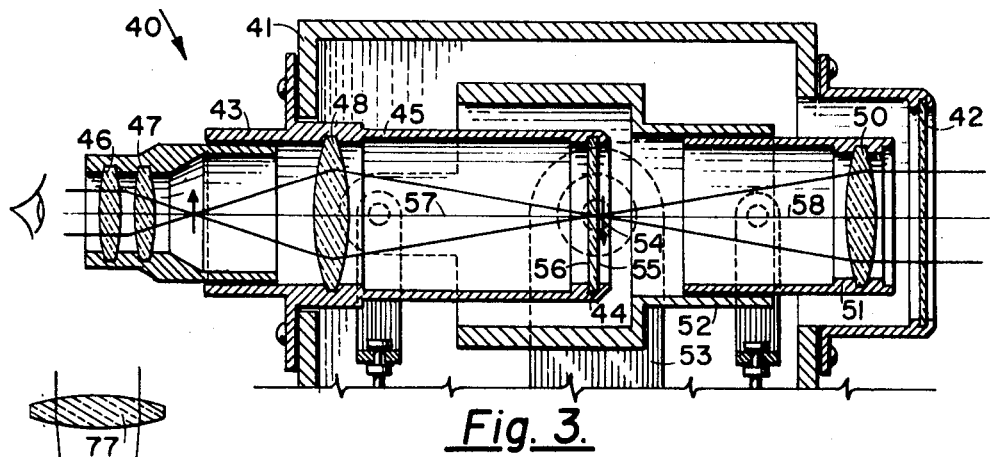
FIG. 3 is a side cross-sectional view of another telescope image stabilization system embodying the present invention.

In FIG. 3 there is illustrated another form of the invention consisting of a telescope 40 having a housing 41 to which is rigidly connected a transparent window 42 for admitting light from a surveyed field, an eyepiece lens system 43, and an image transfer plate 44 rigidly aligned with the eyepiece lens system 43 through a cylindrical tube 45. The eyepiece lens system comprises eyepiece lenses 46 and 47 and an erecting lens 48.

The telescope objective lens 50 is mounted independently of the telescope housing 41 in a cylindrical tube 51, in turn coaxially contained within a support 52. The support 52 and tube 51 are universally pivotally mounted for free movement in the gimbal 53 in which is also pivoted a gyroscope for inertially stabilizing the telescope objective lens 50. The support 52 is mounted on gimbals 53 for rotational movement of the telescope housing 41 and eyepiece lens system 43 and image display plate 44, around a pivot point 54 lying in the plane of the first surface 55 of the image display plate 44 with respect to the inertially stabilized objective lens 50.

The first surface 55 of the image transfer plate 44 is positioned in the focal plane of objective lens 50 and is adapted to receive an image formed by objective lens 50 and transfer the image for display on the second surface 56 of the image transfer plate 44. The objective lens 50 mounted in the cylindrical tube 51 and support 52 is inertially stabilized by a gyroscope to maintain its orientation along the desired line of sight. Again, the pivot point 54 is formed, by way of example, by the intersection of the orthogonal axes of the gimbals in which the objective lens 50 and gyroscope are pivoted. In this form of the invention, where the eyepiece lens system 43 and image display plate 44 are rigidly oriented with respect to a common axis 56 (the optical axis of the eyepiece lens system), the pivot point 54 is located in the first surface 55 of the image display plate so that the image transferred to the second surface 56 for display and viewed by the eyepiece lens system is substantially stationary despite vibration or motion of the telescope housing 41.

As illustrated in FIG. 4, upon vibration or motion of the eyepiece lens system 43, the rigidly aligned eyepiece lenses and image display plate 44 rotate relative to the inertially stabilized objective lens 50 on the gyroscope gimbals around the pivot point 54 located at an intersection of the eyepiece optical axis 57 and the objective lens optical axis 58 lying in the first surface 55 of the image transfer plate 44.

The end of support 52 opposite from objective lens 50 may be suitably weighted to provide a counterweight to the objective lens 50 around pivot point 54.

Figure 5:
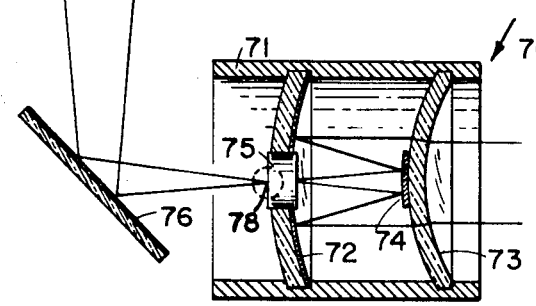
FIG. 5 is a side cross-sectional view of yet another telescope image stabilization system embodying the present invention.

In FIG. 5, there is illustrated an image stabilization system embodying the present invention for use with a Maksutov-type telescope objective. The Maksutov telescope objective 70 is formed of a cylindrical tube 71 in which is mounted a primary reflecting mirror 72 for converging light received through a meniscus lens 73 from a surveyed field. Light reflected by the primary mirror 72 is in turn reflected by a reflecting surface 74 located centrally at the meniscus lens 73 to pass through an opening formed centrally in the primary mirror 72. The image of the surveyed field formed by the primary mirror 72 and secondary mirror 74 is relayed by mirror 76 and lens 77 to further optics for viewing by an eyepiece. The eyepiece and relay lens system and mirror 76 are rigidly connected to a telescope housing. The Maksutov telescope objective 70 is mounted for free movement independent of the eyepiece and relay optics on gimbals in which is also mounted a gyroscope for inertial stabilization of the Maksutov telescope objective. The eyepiece and relay optics and telescope housing are universally pivotally mounted for rotational movement relative to the gyro stabilized Maksutov telescope objective around a pivot point lying in the focal plane of the telescope.

Alternatively, as seen in FIG. 5, an image transfer plate 75 may be interposed in the opening having a first surface positioned at the focal plane of the telescope objective in a second surface spaced from the first surface adapted to display an image received on the first surface and transferred to the second surface. The eyepiece and relay optics are then positioned for viewing the image displayed on the second surface, and the pivot point for rotational movement of the eyepiece and relay optics is located in the plane of the displayed image at the second surface of the image transfer plate.

It is apparent that the embodiment of the present invention described above is also applicable to Cassegrainian, Gregorian, Chretien objectives and telescope objectives generally. In each case, the telescope objective is inertially stabilized for pitch and yaw movement of the eyepiece and relay optics and telescope housing relative to the inertially stabilized objective about a pivot point lying in the focal plane of the telescope objective. An image transfer plate may be positioned with a first surface at the focal plane of the telescope objective and a second surface for displaying an image received on the first surface and transferred to the second surface. The eyepiece and relay optics are then mounted for viewing the image displayed on the second surface and for rotational movement about a pivot point lying in the plane of the second surface.

The gyroscope mounting and linkage system for such image stabilized telescopes are described in my copending U.S. Pat. application, Ser. No. 757,252 filed Sept. 4, 1968, entitled "Optical Device Gyro Linkage System." In each of the embodiments of the present invention inertially stabilized optics may be mounted for free movement in either one plane or two orthogonal planes.

In each of the embodiments of the invention described herein, the image transfer plate having first and second surfaces may be formed by, for example, an image intensifier or a fused fiber optics plate. In the case of an image display screen of negligible thickness, the screen is positioned in the focal plane of the objective lens and is rigidly oriented with respect to either the objective lens optical axis or the eyepiece lens system optical axis. For image transfer plates of nonnegligible thickness the pivot point for relative motion between the eyepiece lens system and inertially stabilized objective lens lies either in the second surface or the first surface of the image transfer plate and is rigidly oriented with respect to the objective lens optical axis or the eyepiece lens system optical axis, respectively. A telescope having an image-stabilizing system according to the present invention may be utilized without interposing a real image screen at the focal plane of the objective lens. In that event the pivot point for rotational motion of the eyepiece lens system relative to the inertially stabilized telescope objective lies in the focal plane of the telescope objective.

In the event that light from the objective lens is deflected from the optical axis of the objective lens before the light is imaged on an image display plate or before the real image is formed, the pivot point for rotation of the viewing optics relative to the inertially stabilized objective lens remains substantially in the focal plane of the objective lens where the image would be formed but for the deflection. Such an embodiment of the present invention would incorporate a plane mirror or prism in the optical path, next to the objective lens for deflecting light to an image display plate or further optics off the optical axis of the objective lens. The pivot point thus remains on the optical axis of the objective lens substantially in the focal plane, the particular distance from the objective lens determined by the above-described rules.

In each of the embodiments described herein the position of the pivot point has been defined to provide 100 percent camera stabilization. Ideally, for ocular viewing devices, the position of the pivot point may be modified to provide a pivot arm distance between the objective lens and pivot point in most cases a displacement slightly displaced from the exact specified position, for example, a displacement equal to $\pm 1/M$ times the pivot arm distance for 100 percent camera stabilization will provide the ocular correction. Furthermore, pivotal mounting at the pivot point may provide pivotal motion in either one or two planes.

As used in the following claims, viewing means includes camera viewing means and ocular viewing means.

What is claimed is:

1. An image-stabilizing system comprising: objective lens means; an image transfer plate having a first surface positioned in the focal plane of the objective lens means and a second surface spaced from said first surface; viewing means adapted for viewing an image received on the first surface of said image transfer plate and transferred to and displayed on said second surface, said objective lens means mounted for rotation relative to the viewing optics about a pivot point lying in a surface of the image transfer plate; and means for inertially stabilizing the objective lens relative to rotation of the viewing means substantially about said pivot point lying in a surface of the image transfer plate.

2. An image-stabilizing system as set forth in claim 1 wherein said objective lens means and image transfer plate are rigidly oriented relative to a common axis and said pivot point lies in the second surface of the image transfer plate.

3. An image-stabilizing system as set forth in claim 1 wherein said viewing means and image transfer plate are rigidly oriented relative to a common axis and said pivot point lies in the first surface of the image transfer plate.

4. An image-stabilizing system comprising a housing, objective lens means positioned to form an image within said housing, gimbal means mounting said lens on said housing for rotation of said lens relative to the housing about a pivot point lying substantially in the same plane as the image formed by said lens, an image display screen mounted in said housing and interposed in the focal plane of said objective lens means, viewing means rigidly mounted to said housing for viewing the image display screen and means inertially stabilizing the objective lens against angular movement due to angular movement of said housing.

5. An image-stabilizing system as set forth in claim 4 and wherein said image display screen is formed with a first surface positioned in the focal plane of the objective lens means upon which an image can be formed by said objective lens means and a second surface spaced from said first surface adapted to display images transferred from said first surface and wherein said viewing means is optically aligned for viewing said second surface.

6. An image-stabilizing system as set forth in claim 5 and wherein said image display screen and said objective lens are rigidly mounted together with respect to the optical axis of said objective lens and wherein said pivot point lies substantially on the same plane as said second surface whereby said objective lens and said image transfer plate pivot about said pivot point with respect to said housing.

7. An image-stabilizing system as set forth in claim 5 wherein said image display screen is rigidly mounted to said housing and said pivot point lies substantially on the same plane as said first surface.

8. An image-stabilizing system as set forth in claim 4 wherein said viewing means comprises an eye piece lens system and said pivot point is displaced from the plane of the image formed by said objective lens a distance substantially equal to $\pm 1/M$ times the pivot arm distance between the objective lens and said image formed by said lens where M is a magnification of the system and wherein the minus sign is used for erecting telescope and the plus sign is used for an inverting telescope.

9. An image-stabilizing system comprising an objective lens, an image screen mounted in optical alignment for forming an image from said objective lens on said screen, an ocular lens mounted in optical alignment to view the image formed on the opposite side of said screen, housing means rigidly mounting said screen and one of said lenses together and pivot means mounting the other of said lenses to said screen at a pivot point coplanar with an image formed by said screen and inertial means stabilizing said objective lens means against angular movement due to angular movement of the remaining elements of said combination.

10. An image-stabilizing system according to claim 9 and wherein said housing means is formed to rigidly mount said ocular lens and said screen together and wherein said pivot means is mounted on a plane coplanar with the plane of the screen facing said objective lens.

11. An image-stabilizing system according to claim 9 and wherein said housing mounts said objective lens and screen together and wherein said pivot means is on a plane coplanar with the side of the screen facing said ocular lens.